Jan. 11, 1949.  T. F. HEALY  2,458,592
SAFETY MOUNTING FOR SPECTACLES
Filed Dec. 16, 1943
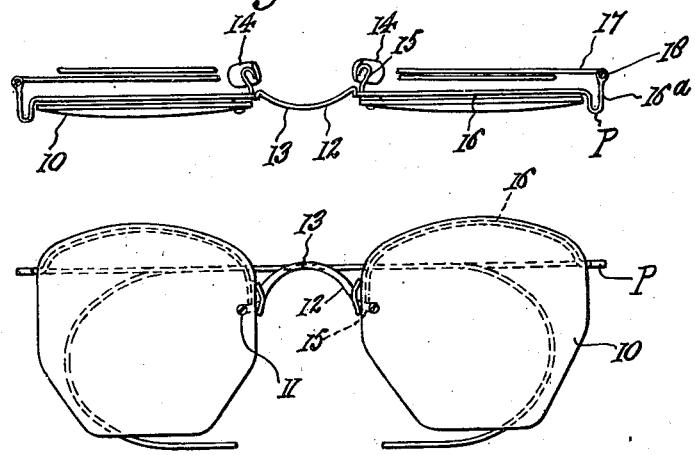
Fig. 1.
Fig. 2.
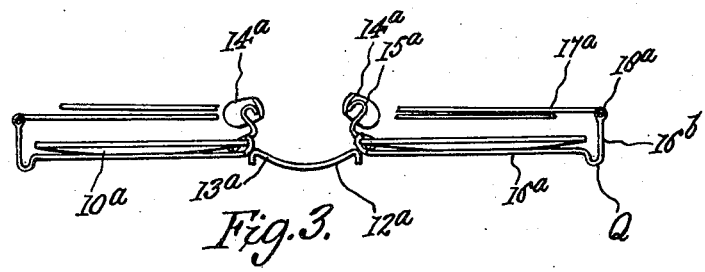
Fig. 3.
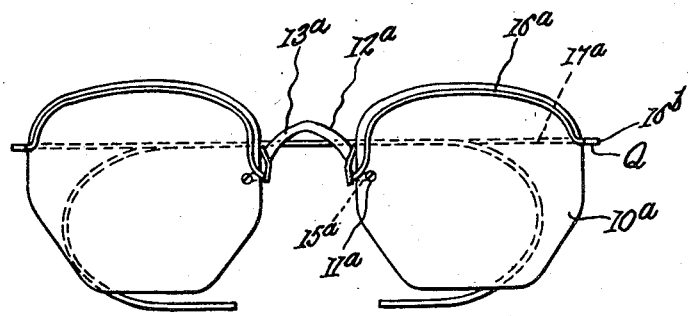
Fig. 4.
Inventor
Thomas F. Healy Patented Jan. 11, 1949

2,458,592

UNITED STATES PATENT OFFICE 2,458,592

SAFETY MOUNTING FOR SPECTACLES

Thomas F. Healy, Washington, D. C., assignor to Saf-Mont, Inc., Washington, D. C., a corporation of Delaware Application December 16, 1943, Serial No. 514,527

2 Claims. (Cl. 88—41)

1

The present invention relates to a safety mounting for lenses, and more particularly to a safety mounting for drilled ophthalmic lenses of the type ordinarily employed in rimless spectacles.

The primary object of this invention is to provide a safety mounting which, in combination with two aligned drilled lenses, results in a protective structure for the lenses.

A further object is to provide an inexpensive and simple mounting for lenses in which the temple-supporting members thereof follow the contours of the upper edges of the lenses in such a manner that there will be a minimum restriction of vision due to the mounting.

Another object is to provide a mounting for lenses having crimped portions in the temple-supporting wires intermediate the ends thereof; and said crimped portions serving to protect the lenses from easy breakage.

Still another object is to provide crimped temple-supporting wires in a mounting assembly for drilled spectacle lenses in such a combined relationship that the crimped portions of the said temple-supporting wires will preferably first engage any flat surface upon which the mounted lenses are horizontally disposed with convex surfaces downward, and wherein each of said temple supporting wires is free to flex to absorb jolts which would normally strike said lenses.

Another object is to provide a safety mounting assembly for spectacle lenses of such structure that the lenses are more completely protected against breakage when the spectacles are disposed in the ordinary spectacle container now employed in the art.

The broad concept of this invention embraces the feature of crimping the temple-supporting members of the safety spectacle mounting in such a manner that the spectacle lenses are protected against jolts normally causing breakage.

More specifically, this invention embraces a safety mounting for two spaced aligned spectacles lenses each having only one drilled hole, and includes a central lens supporting means consisting of a central bridge portion to fit over the nose, guard means adapted to fit on the sides of the nose and strap means, one anchored to each lens. The two lenses are secured together through the central lens supporting means, which per se, does not constitute a part of this invention. Relatively long and slender temple supporting wires preferably of a flexible nature, are each secured at one end thereof to said central lens

2 supporting means. Each of said temple supporting wires preferably follows the contour of the top of its corresponding lens and extends across either the convex or concave face thereof. The outer end portion of each of said temple supporting wires is bent around the edge of its corresponding lens, preferably in spaced apart relation thereto, and thence backward upon itself to form a crimped portion. Each of said temple supporting wires engages a temple member beyond said crimped portion, preferably on the concave side of the corresponding lens.

Further objects and advantages of the invention will be apparent from the following description thereof and from the claims appended thereto.

In the drawing, in which two forms of my invention are shown, and wherein like numerals refer to like or corresponding parts throughout the several views:

Figure 1 is a top plan of the safety mounting for spectacles and embodies the invention, Figure 2 is a front elevation of the mounting, shown in Figure 1, Figure 3 is a top plan view of a modified form of the invention wherein the temple-supporting wires extend across the convex surfaces of the lenses of the mounting assembly, and Figure 4 is a front elevation of the mounting shown in Figure 3.

Referring now to the drawing, and more particularly to Figures 1 and 2, the numeral 10 indicates an ophthalmic lens preferably drilled at only one point, as 11. Inasmuch as the structure of the mounting is identical relative to both lenses, the description thereof will be limited to only one lens.

The numeral 12 generally indicates a lens supporting means for holding the lenses in spaced alignment and in secured together relationship. The central lens supporting means 12 consists of a central bridge portion 13 adapted to fit over the nose of the person wearing the spectacles, guard means 14 adapted to fit on the sides of the nose and strap means 15, anchored to the lens 10 at the hole 11 in any suitable conventional manner. The lens supporting means 12 does not per se constitute a part of this invention. Any suitable means known in the art for securing together spectacle lenses can be employed in the practice of the invention.

A temple-supporting wire 16 is secured to the lens supporting means 12 in any suitable manner as by soldering. Said wire 16 preferably follows the contour of the upper edge portion of the lens 10 and extends beyond the edge of said lens 10 at a point remote from the lens supporting means 12.

The wire 16 is bent around the edge of the lens 10 and extends forwardly to a point P, where it is bent back upon itself to form portion 16a for engagement with the temple member 17 at the pivot point 18. The point P of the wire 16 is in such a relationship to the convex side of the lens 10 that the point P will preferably first engage a flat surface when the spectacles are horizontally disposed so as to permit a flexing of the wire 16 to absorb any frontwise jolts. Edgewise jolts are absorbed by the flexing of portion 16a of the wire 16.

The safety mounting of the invention absorbs shocks from edgewise and frontwise directions. Also the spectacle lenses can be placed with convex faces downward and because the point P is preferably forward of the most forward portion of the convex sides of the lenses, there is no scratching of the convex faces of the lenses when the spectacles are disposed with the convex faces of the lenses downward.

The structure of the modified form of the invention shown in Figures 3 and 4 is somewhat similar to the preferred form of the invention. The numeral 10a indicates an ophthalmic lens drilled at 11a. The numeral 12a generally indicates the central lens supporting means which consists of a central bridge portion 13a, nose guard means 14a and strap means 15a.

The temple supporting wire 16a is secured to the lens supporting means 12a behind the lens 10a, or on the concave side thereof. Wire 16a extends forwardly around the edge of the lens 10a and across the convex face thereof, following the contour of the upper edge of said lens. The wire member 16a then extends forwardly of the convex face of lens 10a to a point Q remote from the lens supporting means 12a and preferably laterally offset from the edge of the lens 10a, and then backwards upon itself to form wire portion 16b for engagement with the temple member 17a at the pivot point 18a.

The point Q of the wire 16a is preferably disposed with relation to the convex side of the lens 10a so that the point Q of the wire 16a will first engage a flat surface when the spectacle lenses are horizontally disposed with convex faces downward. Wire 16a is preferably spaced from lens 10a so as to permit flexing thereof toward said lens without contacting the same. It is not necessary to space wire 16a from lens 10a as point Q will also absorb shock.

The safety mounting of Figures 3 and 4 affords multiple protection to the lens 10a. Frontwise shocks are absorbed by the flexing of wire 16a. Edgewise shocks are absorbed by portion 16b and also by the portion of wire 16a which is proximate to the point at which it is secured to lens supporting means 12a.

Although the temple-supporting wires 16 and 16a are illustrated as being of substantially circular cross-sectional shape, it is to be understood that the said wires may be formed triangular, square, rectangular, or in any other desired cross-sectional shape. If desired, other flexible materials, such as plastics, may be employed for the temple-supporting members.

It is understood that many shapes of lenses may be employed. The mounting may be integral, or of separate parts joined together to provide a unitary structure.

Reference is made to applicant's copending application, Serial No. 538,136, filed May 31, 1944, for subject matter similar to the matter described in the present application.

Various modifications of this invention will be apparent to those skilled in the art without departing from the spirit of this invention, and it is intended to be limited only by the scope of the appended claims.

What I claim as my invention:

1. Safety spectacles comprising, in combination, a pair of temple members, a pair of lenses each having convex and concave faces, means to secure said lenses together, a pair of flexible temple-supporting members each associated with one of said lenses, each of said temple-supporting members substantially following the contour of the top portion of its corresponding lens, each of said temple-supporting members being bent forward beyond the edge of its corresponding lens, each of said members extending forwardly to a point so that it first engages a flat surface when the spectacles are horizontally disposed thereon with the convex surface of the lenses downward, each of said members then being bent backward upon itself and extending to the concave side of its corresponding lens, each of said temple-supporting members being connected at one end thereof to said first mentioned means, and each of said temple-supporting members being connected at the other end thereof to its corresponding temple member.

2. Safety spectacles comprising, in combination, a pair of temple members, a pair of lenses each having convex and concave faces, means to secure said lenses together, a pair of flexible temple-supporting members each associated with one of said lenses, each of said temple-supporting members being bent forwardly beyond the edge of its corresponding lens, each of said members extending forwardly to a point so that it first engages a flat surface when the spectacles are horizontally disposed thereon with the convex faces of the lenses downward, each of said temple-supporting members then being bent backwardly upon itself and extending to the concave side of its corresponding lens, each of said temple-supporting members being connected at one end thereof to said first mentioned means, and each of said temple-supporting members being connected at the other end thereof to its corresponding temple member.

THOMAS F. HEALY.

REFERENCES CITED

The following references are of record in the file of this patent:

UNITED STATES PATENTS

| Number | Name | Date |
| --- | --- | --- |
| 1,177,189 | King | Mar. 28, 1916 |
| 1,992,260 | Thomson | Feb. 26, 1935 |
| 2,188,380 | Uhlemann | Jan. 30, 1940 |
| 2,223,646 | Splaine | Dec. 3, 1940 |
| 2,255,687 | Splaine | Sept. 9, 1941 |